March 24, 1970  J. R. MARCUS  3,501,826
APPARATUS FOR ASSEMBLING A PAIR OF
ARTICLES ONE WITHIN THE OTHER
Filed April 21, 1967  3 Sheets-Sheet 1
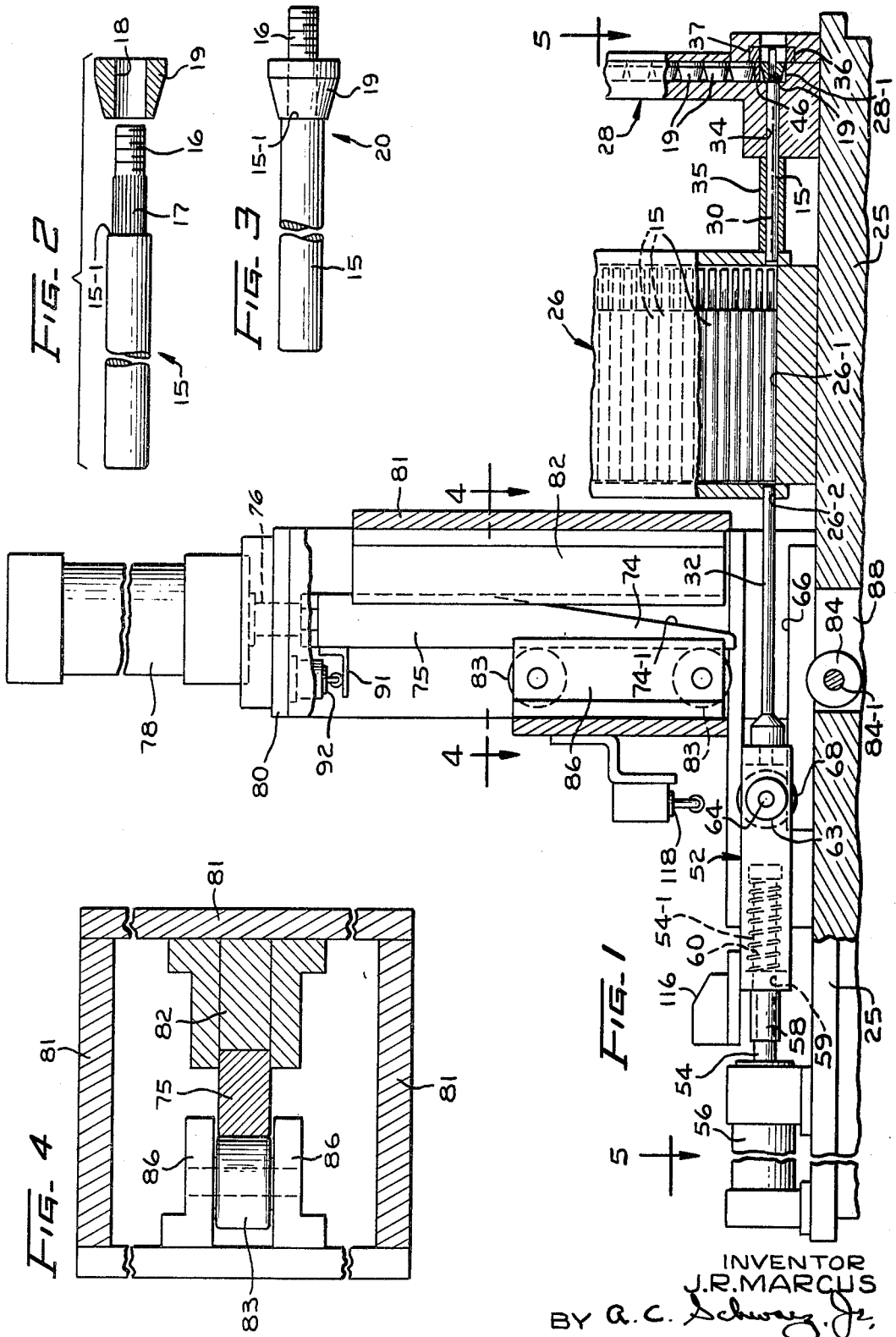
INVENTOR
J. R. MARCUS
BY A. C. Schwarz Jr.
ATTORNEY

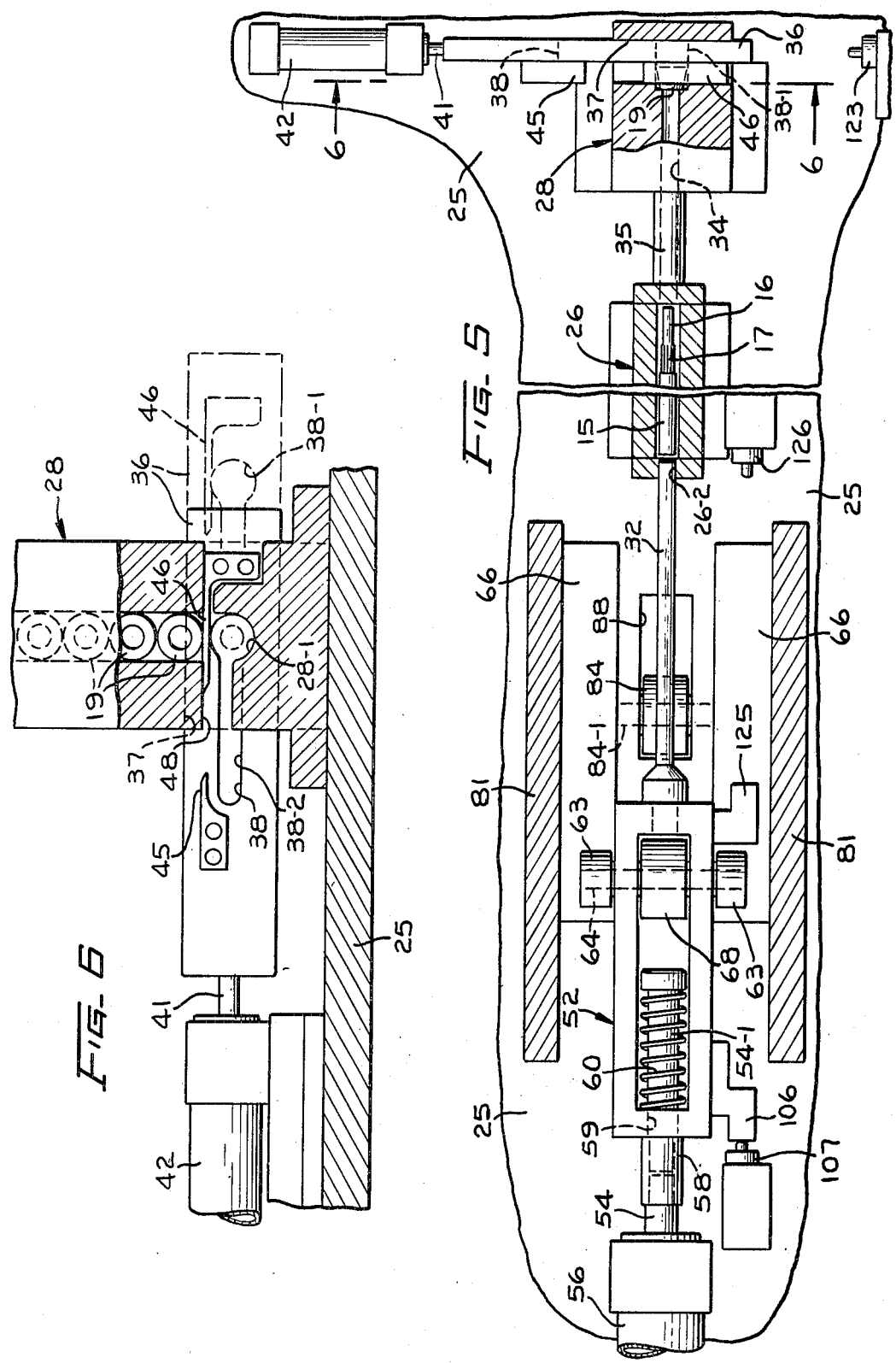

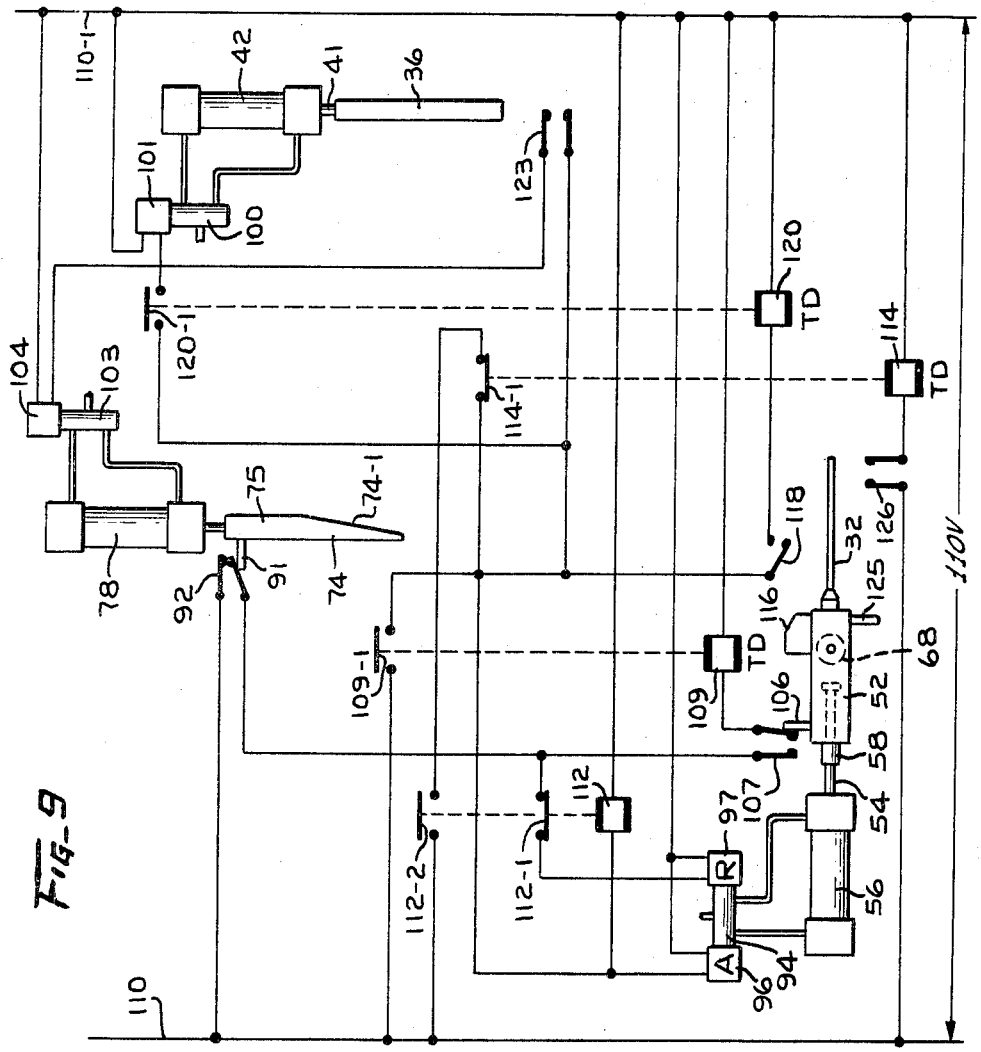
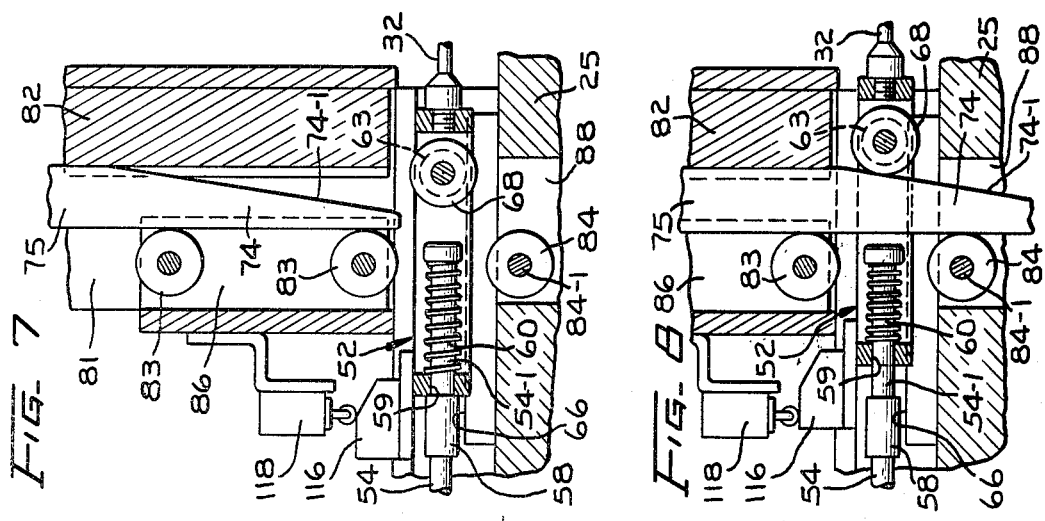

United States Patent Office 3,501,826
Patented Mar. 24, 1970

---

3,501,826
APPARATUS FOR ASSEMBLING A PAIR OF ARTICLES ONE WITHIN THE OTHER
Jerome R. Marcus, Chicago, Ill., assignor to Western Electric Company, Incorporated, New York, N.Y., a corporation of New York
Filed Apr. 21, 1967, Ser. No. 632,582
Int. Cl. B23p 19/04; B23q 7/10
U.S. Cl. 29—211
10 Claims

ABSTRACT OF THE DISCLOSURE

An apparatus for assembling rods and bushings wherein a ram is advanced a predetermined distance by a first actuator to cause it to move a rod from a magazine therefor into proximity to a magazine for the bushings and to effect the ejection from the apparatus of a previously assembled rod and bushing. A reciprocatory anvil and escapement mechanism releases a bushing into the path of the rod and restrains the bushing against axial movement while a wedge is moved transversely of the ram by a second actuator to advance the ram further and push the rod into the bushing.

BACKGROUND OF THE INVENTION

Field of the invention

This invention relates to an apparatus for assembling recessed and non-recessed articles, and more particularly to an apparatus for automatically feeding bushings and rods and forcing the end portions of the rods into the bushings.

An object of the invention is to provide a simple and effective apparatus for assembling apertured and non-apertured articles.

Another object of the invention is to provide an apparatus for automatically pressing the end portions of successive rods into successive apertured bushings.

SUMMARY OF THE INVENTION

An apparatus illustrating certain features of the invention may include a ram and a first actuator for moving the ram through a first magazine to an intermediate position and for causing the ram to remove the lowermost articles from the magazine and advance it into close proximity to the lowermost one of a row of apertured articles in a second magazine. A wedge mounted for movement transversely of the ram is operated by a second actuator to advance the ram further and cause it to pass the first article into assembled relation with the second. An anvil, moved to a forward position by a third actuator, restrains the second article against movement while the first article is being pressed into assembled relation thereto, after which the anvil is moved to a retracted position to permit the assembled articles to be ejected from the apparatus in response to the next advancing movement of the ram and the following article to the intermediate position during the next cycle of operation.

BRIEF DESCRIPTION OF THE DRAWINGS

Other objects, advantages and novel aspects of the invention will become apparent upon consideration of the following detailed description, in conjunction with the accompanying drawings, in which:

FIG. 1 is a fragmentary side elevational sectional view of an apparatus for assembling rods and bushings and showing a ram and a ram actuating wedge in retracted positions;

FIG. 2 is an enlarged sectional elevational view of the rod and the bushing in aligned and adjacent relation to each other;

FIG. 3 is a fragmentary view of the rod and bushing in assembled relation to each other;

FIG. 4 is an enlarged fragmentary plan sectional view of the apparatus taken on the line 4—4 of FIG. 1;

FIG. 5 is an enlarged fragmentary plan sectional view of the apparatus taken on the line 5—5 of FIG. 1;

FIG. 6 is an enlarged fragmentary vertical cross-sectional view of the apparatus taken on the line 6—6 of FIGS. 1 and 5 showing the bushing magazine with the associated reciprocatory escapement and anvil for the bushings;

FIG. 7 is a fragmentary vertical longitudinal sectional view of the apparatus showing the ram in an intermediate position and an auxiliary ram actuating wedge in retracted position;

FIG. 8 is a view similar to FIG. 7 showing the wedge and the ram in advanced positions; and FIG. 9 is a diagrammatic view of the control mechanism of the apparatus.

DETAILED DESCRIPTION

Referring to FIGS. 2 and 3 of the drawings there is shown a rod 15 having a reduced end section 16 which has a longitudinally knurled portion 17 and is adapted to be pressed into the aperture 18 of a bushing 19 by the present apparatus to form an assembly 20, as indicated in FIG. 3. The knurled portion 17 of the rod has a diameter that is slightly larger than the bore of the bushing so that a relatively high pressure is required to press the rod and bushing into assembled relationship.

The apparatus for assembling the components 15 and 19 comprises a horizontal base plate 25 (FIG. 1) on which are fixedly mounted a magazine 26 for the rods 15 and a magazine 28 for the bushings 19. The magazine 26 has a vertically disposed guideway, open at the top, for receiving a vertical row of the rods and is provided at the lower end thereof with a seat 26–1 for supporting the lowermost rod 15 in a predetermined position in coaxial alignment with a horizontal axis 30 and a horizontally movable ram 32.

The magazine 28 is likewise provided with a vertically disposed guideway open at the upper end for receiving a row of the bushings 19, and with a seat 28–1 (FIG. 6) for supporting the lowermost bushing 19 in coaxial alignment with the axis 30. A guideway 34 in the lower portion of the magazine 28 cooperates with a guide tube 35 extending between the magazines 26 and 28 for guiding successive rods 15 from the rod magazine 26 into engagement with successive bushings 19 in the bushing magazine 28.

An anvil 36 (FIGS. 1, 5 and 6) in the form of a rectangular bar is slidably mounted for horizontal movement transversely of the axis 30 in a slideway 37 in the lower portion of the bushing magazine 28 for restraining the bushing 19 against longitudinal movement during the forcing of the rod 15 into assembled relation therewith by the ram 32. As shown in FIG. 6 the anvil 36 is provided with a key hole slot 38 having an enlarged circular end 38–1 of a size sufficient to permit the rod and bushing assembly 20 to pass therethrough along the axis 30, and has a restricted horizontally disposed narrow slot 38–2 through which only the reduced end portion 16 of the rod 15 may pass during the operation of forcing the rod into the bushing.

At one end thereof the anvil 36 is connected to a piston rod 41 (FIGS. 5 and 6) of a fluid operated actuator 42 which is mounted on the base plate 25 and serves to reciprocate the anvil from a retracted position as shown in full lines in FIG. 6 to a forward position as indicated in dotted lines therein. In its forward position the small end 38–2 of the slot 38 is coaxially aligned with the axis 30 and the rod 15, and the portions of the anvil surrounding the slot end 38–2 engages one end of the bushing 19 to restrain it against axial movement as the rod 15 is moved axially thereinto.

Under certain conditions depending on the design of the components which are to be assembled, the apparatus may be provided with an auxiliary device for restraining one component (the bushing 19) against upward movement while the other component (the rod 15) is being assembled thereto, and for supporting the other component (bushing 19) out of the path of the components being assembled. As shown in FIG. 6 a pair of horizontally disposed fingers 45, 46 are suitably secured to the anvil 36 in horizontally spaced relation to each other for movement therewith in a horizontally and transversely disposed aperture 48 in the magazine 28. The fingers 45, 46 serve as an escapement for allowing the lowermost bushing 19 of the row to pass therebetween onto the seat 28–1 of the magazine and to raise slightly and support the remaining bushings 19 of the row while the rods 15 and bushings 19 are being assembled. The finger 45 also overlies the bushing 19 and restrains it against possible upward movement during the assembly operation.

Referring to FIGS. 1 and 5, one end of the ram 32 is supported in an aperture 26–2 in the magazine 26 adjacent to and in alignment with the lowermost rod 15. The ram 32 which is in the form of cylindrical rod is secured to one end wall of a hollow rectangular carriage 52. The other end wall of the carriage is yieldably connected to a composite piston rod 54 of a piston (not shown) which is reciprocable within a cylinder of a fluid operated actuator 56 that is secured to the base plate 25. The piston rod 54 has a headed section 54–1 connected thereto by a coupling sleeve 58 and extends through an aperture 59 in the carriage end wall. A helical compression spring 60 interposed between the head of the headed section 54–1 of the piston rod and the end wall of the carriage 52 urges the carriage to the left as viewed in FIG. 5 and yieldably maintains it in abutting engagement with the end of the coupling sleeve 58 of the piston rod 54.

Rollers 63 (FIGS. 1 and 5) disposed on opposite sides of the carriage 52 are secured to a pin 64 journalled in the carriage and ride on a pair of horizontally disposed rails 66 which are secured to the base plate 25 and support the carriage for horizontal movement. Also mounted on the pin 64 within the carriage 52 is a roller 68.

In response to operation of the actuator 56 the carriage 52 is advanced a predetermined distance to an intermediate position (FIG. 7) and causes the ram 32 to engage and push the lowermost rod 15 from the magazine 26 to an intermediate position with the leading end portion of the rod disposed in the guideway 34 of the magazine 28 adjacent to the seat 28–1 and in close proximity to the path of downward movement of a bushing 19 onto the seat.

The anvil 36 is then advanced to its forward position (FIG. 6) by the actuator 42 during which advancing movement the lowermost bushing 19 drops between the escapement fingers 45 and 46 onto the seat 28–1 in coaxial alignment with and in close proximity to the end of the rod 15 after which the finger 45 overlies the lowermost bushing and raises the remainder of the row of bushings slightly to eliminate any interference therefrom. With the anvil 36 in its forward position the bushing 19 is restrained thereby against axial movement and by the finger 45 against upward movement as the rod 15 is forced into the bushing.

Inasmuch as the diameter of the knurled portion 17 of the rod is slightly greater than the internal diameter of the aperture 18 of the bushing 19 it is necessary to apply a relatively large force to the ram to drive the knurled portion of the rod into assembled relation to the bushing. This is achieved by auxiliary mechanism including a wedge 74 mounted for movement transversely of the axis 30 and having a sloping face 74–1 cooperable with the carriage roller 68.

The wedge 74 is formed on a vertically disposed plunger 75 which is connected to a piston rod 76 for reciprocation therewith by a fluid operated actuator 78. The actuator 78 is mounted on a stand 80 having vertical frame plates 81 extending upwardly from the base plate 25. The wedge is guided for vertical movement and is restrained against lateral displacement by a fixed guide member 82 and a plurality of guide rollers 83, 83 and 84. The guide member 82 is suitably secured to the stand 80. The rollers 83 are rotatably mounted in a bracket 86 also secured to the stand 80. The guide roller 84 is rotatably supported on a pin 84–1 in the base plate 25 and is disposed in an aperture 88 in the base plate which aperture provides clearance for movement of the wedge 74.

With the carriage 52 advanced to its intermediate position as shown in FIG. 7 by the actuator 56, the roller 68 on the carriage is located below and in the path of travel of the sloping surface of the wedge 74, whereby in response to downward movement of the wedge, the carriage 52, the ram 32 and the rod 15 are advanced to a forward position and through a distance sufficient to to cause the knurled portion 17 of the rod 15 to be forced into the bushing and the shoulder 15–1 formed on the rod to seat against the end of the bushing.

During the forward movement of the carriage 52 by the wedge 74, the carriage compresses the spring 60 and separates from the end of the coupling member 58 on the piston rod 54. As the wedge 74 is raised and withdrawn from the carriage 52 to its retracted position, the spring 60 expands and returns the carriage into engagement with the end of the coupling member 58.

A control mechanism is provided for effecting the automatic sequential operation of the several actuators to effect the automatic and continuous operation of the apparatus. Referring to FIG. 9, the wedge 74 is shown in its upper retracted position in which a finger 91 thereon actuates a normally open switch 92 to closed position. The anvil 36 is shown in its retracted position and the carriage 52 is shown as it approaches its retracted position.

Reciprocation is imparted to the piston rod 54 and the carriage 52 in response to admission of compressed air to opposite ends of the actuator 56 under control of a valve 94. Reversal of the movable control element of the valve 94 is effected by a pair of solenoids 96 and 97 whereby in response to the energization of the solenoid 96 compressed air is admitted to the actuator 56 to effect the advancement of the carriage 52 to its intermediate position (FIG. 7) and in response to the energization of the solenoid 97 the actuator 56 is operated to return the carriage 52 to its retracted position (FIGS. 1 and 5).

Reciprocation of the anvil 36 is effected by the admission of the compressed air to opposite ends of the actuator 42 under control of a valve 100, a movable control element of which is biased to effect the movement of the anvil to its retracted position. The valve has a solenoid 101 for effecting the forward operation of the actuator 42 in response to energization of the solenoid.

In like manner the actuator 78 serves to reciprocate the wedge 74 in response to admission of compressed air to opposite ends of the actuator under control of a valve 103. The valve has a movable control element which is biased in one direction to a normal position, to effect the retraction of the wedge, and is shifted to another position by a solenoid 104 in response to energization thereof, to effect the advancement of the wedge.

OPERATION

In response to the return movement of the carriage 52 to its retracted position a finger 106 thereon actuates the normally open switch 107, suitably supported in its path of movement, to closed position. The switch 107 is connected in series with the wedge actuated switch 92 and a time delay relay 109 across a source of electrical power indicated by the lines 110, 110–1. The closing of switch 107 effects the energization of the relay 109 and after a predetermined interval of time the closing of the contacts 109–1 thereof.

The relay contacts 109–1 are connected across the power lines 110, 110–1 in series with a relay 112. With the closing of the contacts 109–1 the relay 112 is energized to effect the opening of the normally closed relay contacts 112–1 and the closing of normally open relay contacts 112–2. The relay contacts 112–2 are connected across the power lines in series with the normally closed contacts 114–1 of a time delay relay 114, and with the solenoid 96. In response to the energization of relay 112 and the closing of the contacts 112–2 the relay 112 is locked in across the power lines and in response to the opening of the relay contacts 112–1 the return solenoid 97 of the valve 94 is deenergized.

The relay contacts 109–1 are also connected in series with the advanced solenoid 96 of the valve 94 across the power lines 110, 110–1, and with the closing of the contacts 109–1 the solenoid 96 is energized and effects the reversal of the valve 94, the operation of the actuator 56, and the advancement of the piston rod 54. This advances the carriage 52 to its intermediate position thereby causing the ram 32 to push the lowermost rod from the magazine 26 to an intermediate position with the end of the rod located in close proximity to the seat 28–1 for the bushing 19. During this advancement of the carriage 52, the switch 107 is restored to its normal open condition, and as the carriage 52 approaches its intermediate position a finger 116 thereon actuates a normally open switch 118 to a closed position.

The switch 118 is connected across the power lines in series with a time delay relay 120, the normally closed contacts 114–1 and the temporarily closed contacts 112–2, and in response to the closing of the switch 118 the time delay relay 120 is energized to close the normally open contacts 120–1 thereof after a predetermined interval of time. With the closing of the latter contacts a circuit is completed through relay contacts 109–1, 120–1 and solenoid 101 to effect the energization of the latter, and the operation of the actuator 42 results in the movement of the anvil 36 from its retracted position to its advanced position.

During this movement of the anvil the escapement finger 46 is removed from beneath the row of bushings 19 and the lowermost bushings of the row drops between the escapement fingers into the seat 28–1 of the magazine 28 in coaxial alignment with the rod 15 disposed adjacent thereto. The other escapement finger 45 engages the next to the lowermost bushing and raises it and those above preparatory to the assembling of the rod 15 and the bushing 19. It will be noted that in the advanced position of the anvil 36 the narrow slotted portion thereof supports the bushing against axial movement while providing clearance for movement of the end portion 16 of the rod 15 therethrough.

As the anvil 36 reaches its advanced position it engages a normally open switch 123 suitably supported in its path and actuates it to closed position. The switch 123 is connected across the power line in series with the solenoid 104 of valve 103, normally closed contacts 114–1 of time delay relay 114, and temporarily closed contacts 112–2 of relay 112. In response to the closing of the switch 123 the solenoid 104 is energized and the valve 103 is reversed to effect the operation of the actuator 78 and the downward advancing movement of the wedge 74 with the carriage 52 disposed therebelow in its intermediate position as shown in FIG. 7. As the wedge 74 descends it moves into the central aperture of the carriage 52, engages the roller 68 and advances the carriage 52, the ram 32, and a rod 15 with sufficient force to cause the knurled portion 17 of the rod to be pressed into the bushing 19 and cause the shoulder 15–1 of the rod to seat against the end surface of the bushing, at which time downward movement of the wedge 74 is automatically stopped.

As the carriage 52 reaches the end of its secondary movement under the influence of the wedge 74, a finger 125 on the carriage actuates a normally open switch 126 to closed position. This effects the energization of the time delay relay 114 and after a predetermined interval of time, the opening of the contacts 114–1 thereof. With the opening of the relay contacts 114–1 the relays 112 and 120 are disconnected from the power lines and are deenergized. With the deenergization of relay 120 the temporarily closed contacts 120–1 are opened causing the deenergization of the solenoid 101, the reversal of the valve 100, and the reverse operation of actuator 42, resulting in the return of the anvil 36 to its retracted position. With the deenergization of relay 112 the temporarily closed contacts 112–2 are opened and the temporarily open contacts 112–1 are closed to condition the circuit associated with the return solenoid 97 of valve 94 for the actuator 56.

With the opening of the switch 123 in response to the retraction of the anvil 36, the solenoid 104 associated therewith is deenergized and effects the reversal of the valve 103 and the reverse operation of the actuator 78, resulting in the return movement of the wedge 74 to its retracted position. During this return movement of the wedge 74 the spring 60, encircling the piston rod 54–1, moves the carriage from the advanced to the intermediate position.

As the wedge 74 reaches its retracted position the normally open switch 92 is actuated to closed position. This completes a circuit through the relay contacts 112–1 and the reverse solenoid 97 of valve 94 resulting in the energization of the solenoid 97, the reversal of the valve 94, the reverse operation of the actuator 56 and the return movement of the carriage 52 from its intermediate position (FIG. 7) to its retracted position (FIG. 1). As the carriage 52 reaches its retracted position the switch 107 is closed thereby and a new cycle of operation is initiated.

It will be understood that after the rod 15 has been pressed into assembled relation with the bushing 19 and after the backup anvil 36 has been returned to its retracted position, the enlarged portion 38–1 of the aperture 38 is coaxially aligned with the rod and bushing assembly 20. During the next cycle of operation as the carrier 52 and the ram 32 are advanced to the intermediate position, the rod 15 advanced thereby from the magazine 26 engages the rod and bushing previously assembled and ejects the assembly 20 from the apparatus into a suitable receptacle therefor.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:
1. Apparatus for assembling a pair of articles one within the other, which comprises:
 a reciprocally movable carrier;
 a ram mounted on said carrier for movement along a predetermined path to and from a retracted position;
 means for feeding a first article to a predetermined position in the path of movement of the ram so as to be advanced thereby to an intermediate position in response to movement of said carrier and said ram to intermediate position;
 means for advancing said carrier and said ram from the retracted position to the intermediate position;
 means for feeding a second article adjacent to the first article at the intermediate position and in the path of movement of the first article, and
 a second means reciprocally movable in a direction transverse to said predetermined path for biasing against said carrier and through cam action advancing said carrier and said ram from the intermediate position by a distance and with a force sufficient to cause the ram to move the first article into assembled relation with the second article.

2. An apparatus as defined in claim 1 including the provision of:

an anvil mounted for movement transversely of the path of said ram to an advanced position for engaging and restraining the second article against movement during the assembling of the first article therewith, and to a retracted position wherein the assembled articles may be removed from the apparatus; and means for actuating said anvil to and from the advanced and the retracted positions.

3. An apparatus for assembling an elongated first component and an apertured second component which comprises:

a ram;

a carrier for supporting said ram;

mounting means for supporting said carrier and said ram for longitudinal reciprocation along a predetermined path to and from a normally retracted position;

a first holding means on said mounting means for supporting a first component at a predetermined position in the path of movement of said ram and for movement along said path;

a first actuating means on said mounting means for advancing said carrier and said ram from the retracted position to an intermediate position to cause the ram to advance the first component from said first holding means to an intermediate position;

a second holding means on said mounting means for supporting a second component adjacent to the first component in the intermediate position and in the path of movement thereof;

an element supported on said mounting means for movement transversely of the path of movement of said ram and in alignment with said carrier in its intermediate position for imparting further advancing movement to said carrier and said ram with a greater force than that of said first actuating means to cause said ram to force the first component into assembled relation with the second component; and a second actuating means on said mounting means for imparting transverse movement to said element.

4. An assembling apparatus as defined in claim 3 wherein:

said first holding means comprises a magazine for supporting an upwardly directed row of the first components therein for movement of the components successively into alignment with said ram; and said second holding means comprises a magazine for supporting an upwardly directed row of the second components therein for movement of the components successively into alignment with said ram and the rod.

5. An assembling apparatus as defined in claim 4 including the provision of:

an anvil slidably mounted on said mounting means for movement transversely of the path of movement of said ram to an advanced position for restraining the second component against movement during the assembly of the first component therewith, and to a retracted position wherein the assembled first and second components may be removed from the apparatus; and a third actuating means for reciprocating said anvil to and from the advanced and the retracted positions.

6. An assembling apparatus as defined in claim 5 including the provision of:

control means for effecting the operation of said first, second, and third actuating means in a predetermined time relation to one another.

7. An assembling apparatus as defined in claim 3 wherein:

said first actuating means includes a reciprocatory piston rod having shoulder means engageable with said carrier for advancing said carrier; and resilient means interconnecting said piston rod and said carrier for urging said carrier in a reverse direction into engagement with said shoulder means of said piston rod and permitting advancing movement of said carrier relative to said piston rod.

8. An assembling apparatus as defined in claim 5 including the provision of:

a pair of escapement members mounted on said anvil for movement transversely of the row of second components supported in said second holding means whereby in response to reciprocatory movement of said anvil a component moves downwardly between and below said escapement members into a position in alignment with said ram, said escapement members alternately overlying such component and alternately underlying and supporting the next component.

9. An apparatus as defined in claim 3 wherein:

said transversely movable element is in the form of a wedge having an obliquely disposed surface engageable wtih said carrier.

10. An apparatus as defined in claim 5 wherein:

said anvil has a key hole slot therethrough with an enlarged opening at one end thereof in alignment with said predetermined path for permitting movement of the assembled first and second components from said second holding means when said anvil is in the retracted position, and said key hole having a narrow portion providing clearance for movement thereinto of an end portion of the elongated first component when said anvil is in the advanced position; and said first holding means and said second holding means being in a predetermined spaced relation to each other whereby in response to advance movement of said carrier and said ram to the intermediate position an elongated first component will be advanced by said ram from said first holding means into engagement with the preceding assembly of first and second components said effect the ejection thereof from the apparatus.

References Cited

UNITED STATES PATENTS

| 1,420,424 | 6/1922 | Hallett | 29—238 |
| 1,657,101 | 1/1928 | Zeitlin | 29—208 X |
| 2,604,692 | 7/1952 | Broden | 29—208 |
| 2,987,812 | 6/1961 | Donaldson | 29—211 X |
| 3,037,268 | 6/1962 | Mitchell et al. | |

THOMAS H. EAGER, Primary Examiner

U.S. Cl. X.R.

29—208